US011690351B2

(12) United States Patent
Shao et al.

(10) Patent No.: US 11,690,351 B2
(45) Date of Patent: Jul. 4, 2023

(54) VENTILATION FAN WITH SYNCHRONOUS BUTTERFLY SHUTTER FOR ANIMAL BUILDING

(71) Applicant: The GSI Group, LLC, Assumption, IL (US)

(72) Inventors: Yu Shao, Suzhou (CN); Shuowei Li, Shanghai (CN); Huaijun Zhou, Shanghai (CN)

(73) Assignee: The GSI Group LLC, Assumption, IL (US)

( * ) Notice: Subject to any disclaimer, the term of this patent is extended or adjusted under 35 U.S.C. 154(b) by 345 days.

(21) Appl. No.: 17/089,271

(22) Filed: Nov. 4, 2020

(65) Prior Publication Data

US 2021/0144951 A1 May 20, 2021

Related U.S. Application Data

(60) Provisional application No. 62/935,292, filed on Nov. 14, 2019.

(51) Int. Cl.
*A01K 1/00* (2006.01)
*F24F 13/14* (2006.01)
(Continued)

(52) U.S. Cl.
CPC .......... *A01K 1/0052* (2013.01); *A01K 1/0064* (2013.01); *F04D 25/14* (2013.01);
(Continued)

(58) Field of Classification Search
CPC .. A01K 1/0052; A01K 1/0064; A01K 1/0047; A01K 1/0058; F04D 25/14; F24F 7/13; F24F 13/1426; F24F 13/24
(Continued)

(56) References Cited

U.S. PATENT DOCUMENTS 2,489,446 A    11/1949    Biancani
3,401,621 A *   9/1968    Aaberg ............... F24F 13/1413
                                                                                               454/228
(Continued)

FOREIGN PATENT DOCUMENTS

CA    2475104 A1   1/2006
EP    0563875 A1   10/1993
(Continued)

OTHER PUBLICATIONS

UK Intellectual Property Office, search report for related UK Application No. GB2000398.4, dated Jun. 2, 2020.

*Primary Examiner* — Vivek K Shirsat

(57) ABSTRACT

A fan assembly for use in a sidewall of an animal house. The fan assembly includes an impeller, a motive force configured to rotate the impeller about a fan assembly axis, and a butterfly shutter. A shutter operation mechanism moves the butterfly doors of the shutter between the closed position and the open position in synchrony with an operating speed of the impeller. The shutter operating mechanism includes pushrods connected to the butterfly doors, and a linkage between the impeller and the second pushrods. The linkage includes at least one weight configured to rotate with the impeller about the fan assembly axis, wherein rotation of the at least one weight causes the linkage to exert a force on the pushrods to push the butterfly doors toward the open position when the impeller is rotating.

15 Claims, 4 Drawing Sheets

(51) Int. Cl.
- *F24F 7/013* (2006.01)
- *F04D 29/00* (2006.01)
- *F24F 13/00* (2006.01)
- *F04D 25/14* (2006.01)
- *F24F 13/24* (2006.01)

(52) U.S. Cl.
CPC .............. *F04D 29/00* (2013.01); *F24F 7/013* (2013.01); *F24F 13/00* (2013.01); *F24F 13/1413* (2013.01); *F24F 13/1426* (2013.01); *F24F 13/24* (2013.01)

(58) Field of Classification Search
USPC ................. 454/254; 415/25; 119/448, 493
See application file for complete search history.

(56) References Cited

U.S. PATENT DOCUMENTS

| | | | | |
|---|---|---|---|---|
| RE32,362 E | * | 2/1987 | McCabe | F16K 1/223 |
| | | | | 137/75 |
| 5,288,202 A | * | 2/1994 | Mancinelli | F04D 25/14 |
| | | | | 415/25 |
| 2006/0286924 A1 | | 12/2006 | Milana | |

FOREIGN PATENT DOCUMENTS

| | | |
|---|---|---|
| EP | 1359326 A1 | 11/2003 |
| KR | 20110009465 A | 1/2011 |

* cited by examiner

VENTILATION FAN WITH SYNCHRONOUS BUTTERFLY SHUTTER FOR ANIMAL BUILDING

CROSS REFERENCE TO RELATED APPLICATIONS

This application claims the benefit of U.S. Provisional Application No. 62/935,292, filed Nov. 4, 2019, which is hereby incorporated by reference in its entirety.

BACKGROUND OF THE INVENTION

Field of Invention

This invention relates to shutters in ventilation systems for animal buildings, and more particularly to a butterfly shutter that opens and closes by centrifugal force associated with impeller speed.

Description of Related Art

Achieving optimal performance from animals raised in commercial animal house buildings (such as a poultry house) depends in part on providing ventilation as correctly and efficiently as possible. Proper ventilation improves overall over air quality, air temperature, and energy usage. Improper ventilation levels can lead to incorrect moisture levels, unsuitable temperatures, and poor air quality.

Ventilation fans are often used as part of the ventilation system for animal houses. The ventilation fans are used in conjunction with shutters that are able to open and close an air duct associated with the fan. One type of shutter commonly used is a butterfly shutter. Typically, butterfly shutters use the airflow generated by the fan to open the shutter when the fan is started. However, in some situations, pressure differentials across the shutter can prevent the shutter from fully opening as desired. Additionally, when the fan stops, the butterfly shutter sometimes snaps shut causing the butterfly door to bang against the shutter frame. This causes loud and sudden noises that can frighten the animals within the building. The loud and sudden noises have negative consequences, such as causing laying hens to refuse to lay eggs.

Accordingly, a need exists for a ventilation fan assembly that allows for better control the operation of the shutter.

OVERVIEW OF THE INVENTION

One aspect of the invention is directed to a fan assembly for use in a sidewall of an animal house. The fan assembly includes an impeller, a motive force configured to rotate the impeller about a fan assembly axis, and a butterfly shutter. The butterfly shutter has shutter frame, a first butterfly door and a second butterfly door, the first and second butterfly doors mounted in the shutter frame and configured to pivot about a central door axis to move to an open position when the impeller is rotating. A shutter operation mechanism moves the first and second butterfly doors between the closed position and the open position in synchrony with an operating speed of the impeller. The shutter operating mechanism includes a first pushrod connected to the first butterfly door and a second pushrod connected to the second butterfly door, and a linkage between the impeller and the first and second pushrods. The linkage includes at least one weight configured to rotate with the impeller about the fan assembly axis, wherein rotation of the at least one weight causes the linkage to exert a force on the first and second pushrods to push the first and second butterfly doors toward the open position.

In another aspect of the invention the fan assembly further includes a spring attachment mounted between the shutter frame and the first butterfly door configured to bias the first butterfly door into the closed position. As the rotational speed of the impeller decreases, the centrifugal force produced by the rotation of the at least one weight decreases and a biasing force of the spring attachment overcomes the centrifugal force causing the first and second butterfly doors to gradually move to the closed position as the impeller slows down, thereby minimizing banging of the butterfly doors into the shutter frame These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
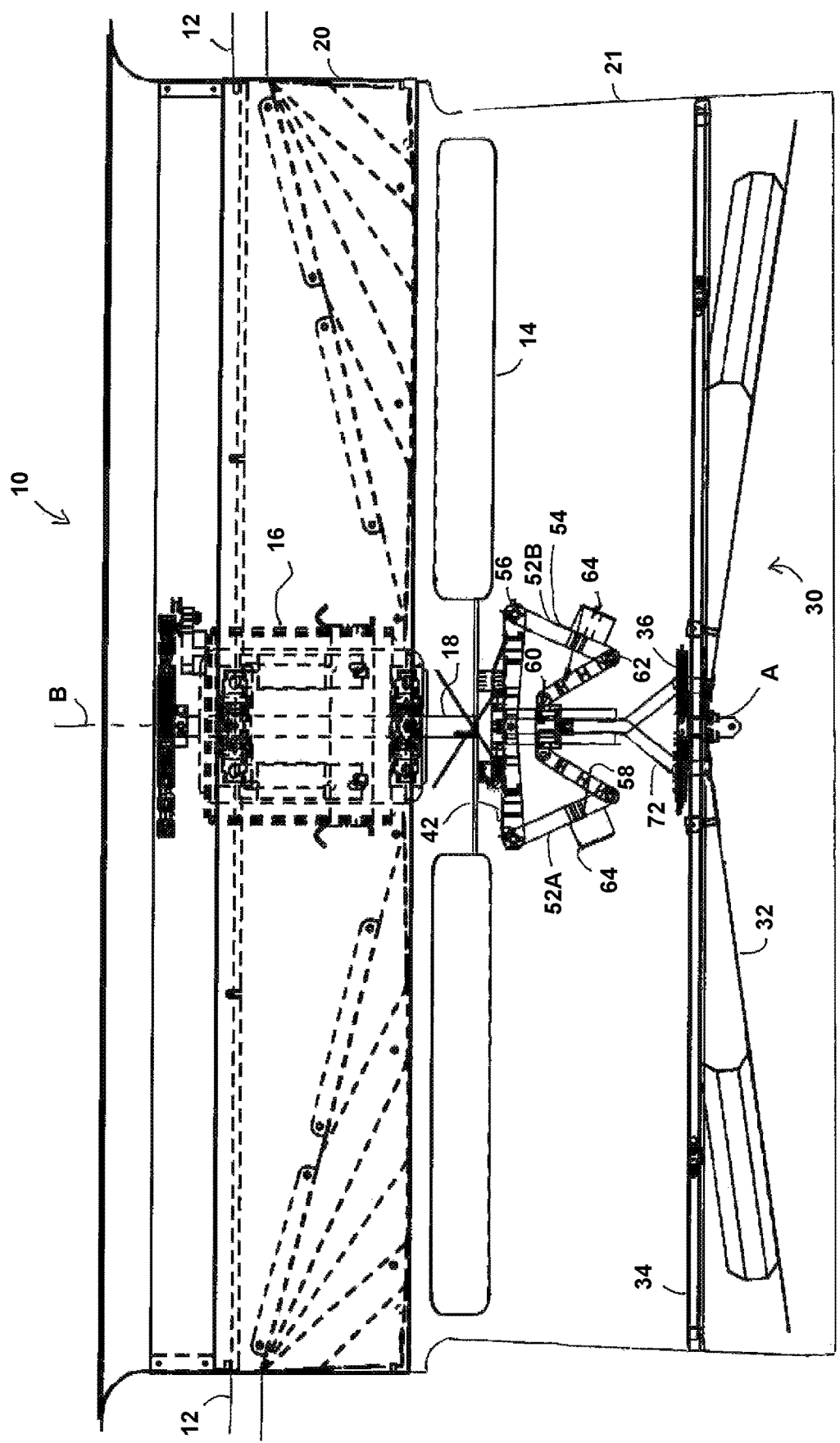
FIG. 1 is a plan view of a fan assembly 10 having a butterfly shutter 30 according to an embodiment of the invention.

FIG. 1 illustrates a fan assembly 10 installed in a portion of a sidewall 12 of an animal house. As is known in the art, fan assemblies 10 are used as part of an overall ventilation system for the animal houses to enable adequate and efficient airflow and circulation within the animal house. The fan assembly 10 comprises an impeller 14 attached to a motive force 16 which turns a fan shaft 18. The fan assembly 10 is mounted within a shroud 20 and cone 21 mounted in the sidewall 12 around an opening to allow airflow through the sidewall 12 from the animal house. The motive force 16, impeller 14 and shroud 20 of the fan assembly 10 may be of any suitable design known to one skilled in the art and need not be discussed further herein.

A butterfly shutter 30 is installed in the cone 21 that desirably moves between an open position when the fan assembly 10 is operating to force air through the opening and a closed position when the fan assembly 10 is off to substantially prevent air and light from passing through the sidewall opening. As is known, the butterfly shutter 30 has a pair of butterfly doors 32 each mounted in a shutter frame 34 and configured to pivot about a central door axis A between the open and closed positions. A spring attachment 36 between the shutter frame 34 and each butterfly door 32 desirably biases the butterfly doors 32 into the closed position.

Figure 2:
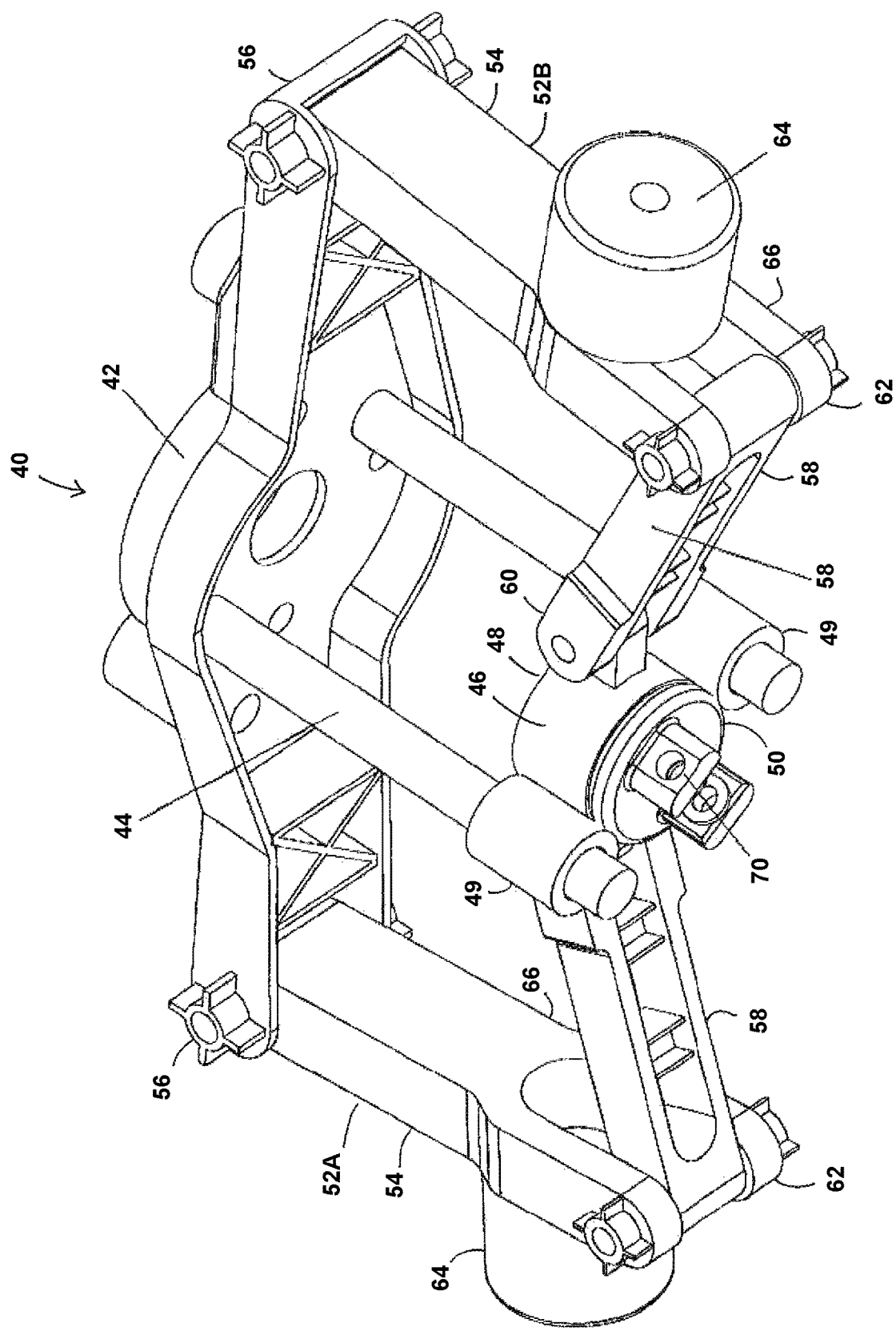
FIG. 2 is a perspective view of a shutter operation mechanism of the fan assembly 10 FIG. 1.

According to the invention, the fan assembly 10 has a shutter operation mechanism 40 that moves the butterfly doors 32 between the closed position and the open position in synchrony with an operating speed of the impeller 14. A pedestal 42 is mounted concentrically with the fan shaft 18 and impeller 14 such that the pedestal 42 rotates with the impeller 14. Turning also now to FIG. 2, at least one slide bar 44 extends from the pedestal 42 away from the impeller 14. In the illustrated embodiment, the pedestal 42 has two slide bars 44. A slider 46 is mounted on the slide bars 44 such that the slider 46 can move relative the pedestal 42 along the slide bars 44. In the illustrated embodiment, the slider 46 has a slider bushing 48 with a pair of eyelets 49. Each one of the eyelets 49 receives a respective one of the slide bars 44 such that the slider bushing 48 is free to slide along a longitudinal axis B of the fan assembly 10 relative the impeller 14. A slider bearing 50 is positioned within the slider bushing 48 and configured such that the slider bushing 48 rotates around the slider bearing 50.

A linkage 52 connects the slider 46 to the pedestal 42 so as to allow movement of the slider 46 along the slide bars 44. In one embodiment, the linkage 52 comprises symmetrical linkage halves 52A, 52B, with each linkage half 52A, 52B having a first arm 54 mounted to the pedestal 42 at a first pivot joint 56 and a second arm 58 mounted to the slider 46 with a second pivot joint 60. The first arm 54 and the second arm 58 are connected with a third pivot joint 62. A weight 64 is mounted on the first pivot 56 arm on an end 66 of the arm near the third pivot joint 62. When the impeller 14 rotates, the pedestal 42, linkage 52 and slider bushing 48 also rotate with the impeller 14, while the slider bearing 50 remains rotationally stationary.

Figure 3:
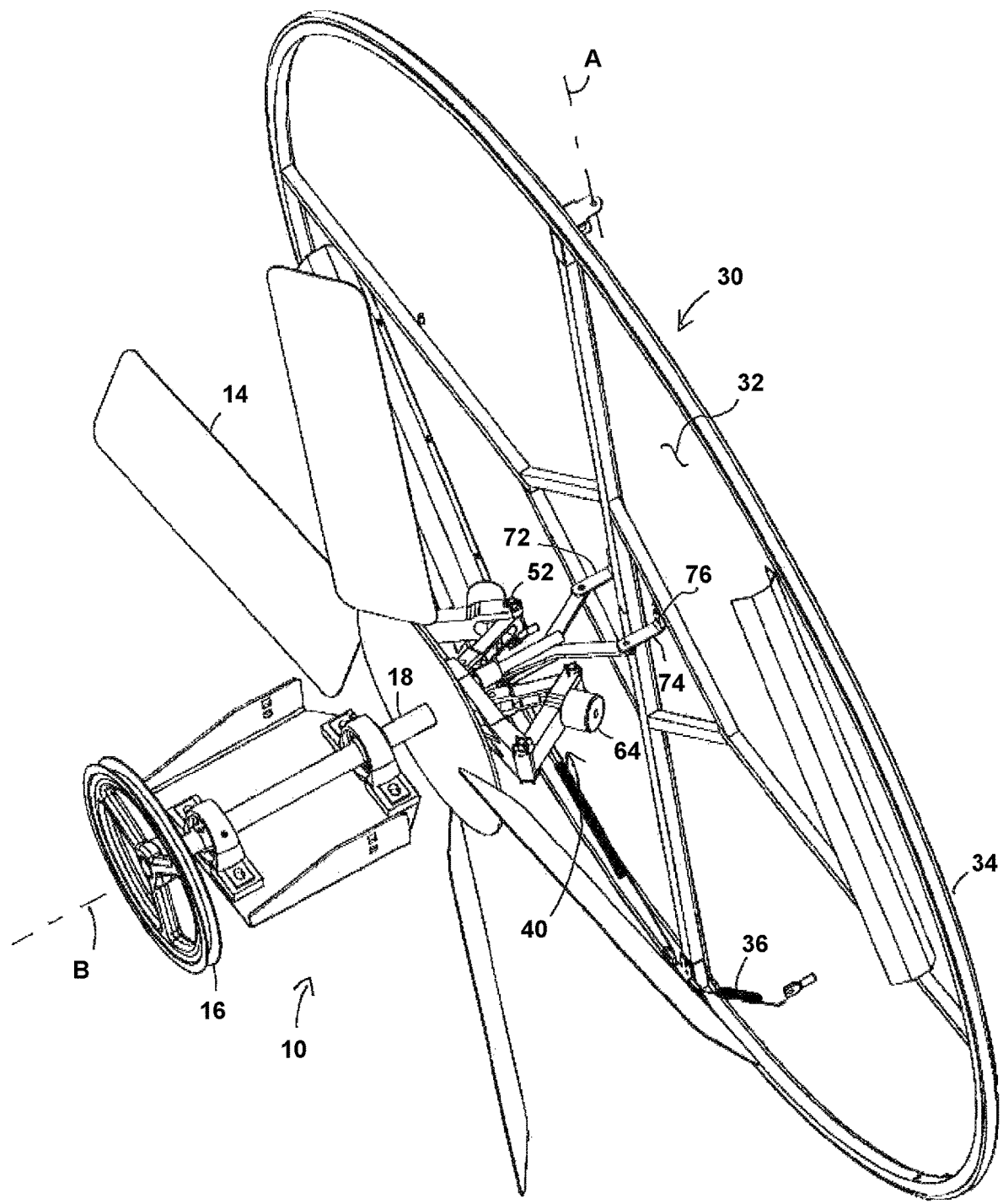
FIG. 3 is a perspective view of the fan assembly 10 with the butterfly shutter 30 in a closed position.
Figure 4:
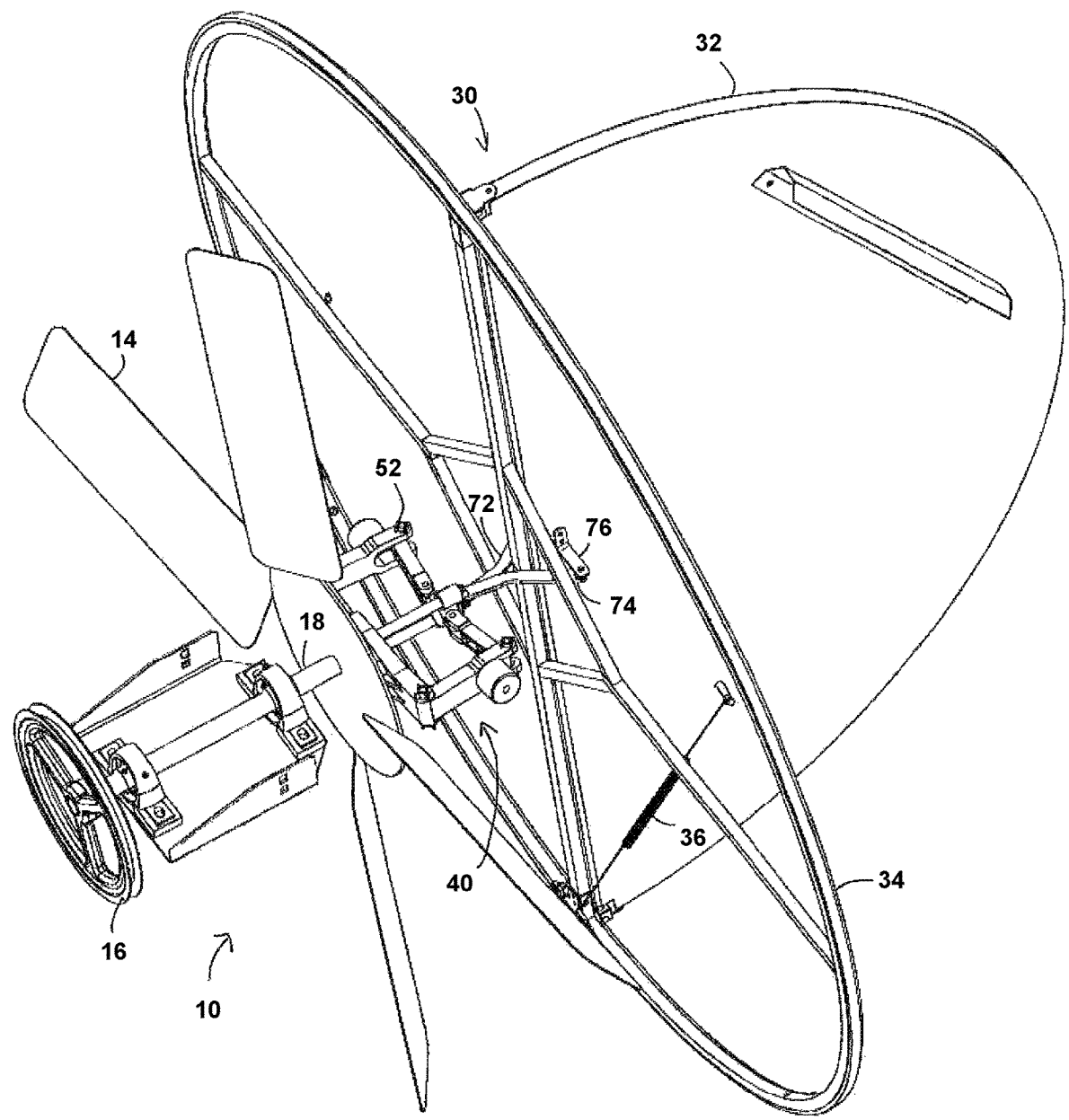
FIG. 4 is a perspective view of the fan assembly 10 with the butterfly shutter 30 in an open closed position.

The slider bearing 50 has a pair of mounting attachments 70 formed thereon. Turning also now to FIGS. 3 and 4, first and second pushrods 72 are attached to the mounting attachments 70 on the slider bearing 50. Distal ends 74 of the first and second pushrods 72 are attached to triggers 76 mounted on the first and second butterfly doors 32, respectively. The slider bushing 48 allows the linkage 52 and slider 46 bars attached to the pedestal 42 to rotate around the slider bearing 50 and pushrods 72. As the slider 46 moves away from the pedestal 42 on the slide bars 44 along the longitudinal axis B, the pushrods 72 mounted on the slider bearing 50 push the butterfly doors 32 toward the open position. Movement of the pushrods 72 is sufficient to overcome the biasing force of the spring attachments 36. As the slider 46 moves back toward the pedestal 42, movement of the pushrods 72 allows the butterfly doors 32 to return to the closed position. The closing force is desirably aided by the biasing force of the spring attachments 36.

When ventilation is desired from the fan assembly 10, the pedestal 42 rotates synchronously with the impeller 14. As the rotational speed of the impeller 14 and pedestal 42 increases, centrifugal force causes the weight 64 on the first arm 54 of the linkage 52 to draw the third pivot joint 62 outwards and away from the slide bars 44. This movement of the linkage 52 causes the slider 46 to move away from the pedestal 42 on the slide bars 44 towards the butterfly shutter 30. This movement of the slider 46 causes the pushrods 72 to push against and open the butterfly doors 32.

Therefore, according to the invention, opening and closing of the butterfly doors 32 is not reliant on the pressure on either side of the butterfly shutter 30 and the airflow produced by the impeller 14, but is positively controlled by centrifugal forces produced by rotation of the impeller 14. As the rotational speed of the impeller 14 increases, the centrifugal force produced by the weights 64 increases and the corresponding movement of the linkage 52 causes the pushrods 72 to open the butterfly doors 32. Conversely, as the rotational speed of the impeller 14 decreases, the centrifugal force decreases accordingly. As the biasing force of the spring attachments 36 overcomes the centrifugal force holding the slider 46 in its extended position, the biasing force causes the butterfly doors 32 to push the slider 46 back towards the pedestal 42. This allows the butterfly shutter 30 to gradually move to the closed position as the impeller 14 slows down, thereby minimizing banging of the butterfly doors 32 into the shutter frame 34.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A fan assembly for use in a sidewall of an animal house, the fan assembly comprising:
   an impeller;
   a motive force configured to rotate the impeller about a fan assembly axis;
   a butterfly shutter having shutter frame, a first butterfly door and a second butterfly door, the first and second butterfly doors mounted in the shutter frame and configured to pivot about a central door axis to move between an open position when the impeller is rotating;
   a shutter operation mechanism configured to move the first and second butterfly doors between the closed position and the open position in synchrony with an operating speed of the impeller, the shutter operating mechanism comprising:
      a first pushrod connected to the first butterfly door and a second pushrod connected to the second butterfly door; and
      a linkage between the impeller and the first and second pushrods, the linkage comprising at least one weight configured to rotate with the impeller about the fan assembly axis, wherein rotation of the at least one weight causes the linkage to exert a force on the first and second pushrods to push the first and second butterfly doors toward the open position;
   a spring attachment mounted between the shutter frame and the first butterfly door configured to bias the first butterfly door into the closed position, wherein movement of the first and second pushrods is sufficient to overcome a biasing force of the spring attachment.

2. The fan assembly of claim 1 wherein the shutter operation mechanism comprises:
   a pedestal mounted concentrically with a fan shaft such that the pedestal rotates with the impeller;

at least one slide bar extending from the pedestal away from the impeller; and a slider mounted on the at least one slide bar such that the slider moves relative the pedestal along the at least one slide bar.

3. The fan assembly of claim 2 wherein the pedestal has two slide bars extending away from the impeller.

4. The fan assembly of claim 3 wherein the slider has a slider bushing with a pair of eyelets, wherein each one of the eyelets receives a respective one of the slide bars such that the slider bushing is free to slide along a longitudinal axis of the fan assembly relative the impeller.

5. The fan assembly of claim 2 wherein the slider has a slider bushing and a slider bearing is positioned within the slider bushing such that the slider bushing rotates around the slider bearing such that when the impeller rotates, the pedestal, the linkage and the slider bushing also rotate with the impeller, while the slider bearing remains rotationally stationary.

6. The fan assembly of claim 5 wherein the linkage connects the slider to the pedestal so as to allow movement of the slider along the at least one slide bar.

7. The fan assembly of claim 6 wherein the linkage comprises symmetrical linkage halves, with each linkage half having a first arm mounted to the pedestal at a first pivot joint and a second arm mounted to the slider with a second pivot joint, the first arm and the second arm being connected with a third pivot joint, and wherein a weight of the at least one weight is mounted on the first pivot arm on an end of the arm near the third pivot joint.

8. The fan assembly of claim 5 wherein the slider bearing has a pair of mounting attachments formed thereon, and wherein the first and second pushrods are attached to the mounting attachments on the slider bearing.

9. The fan assembly of claim 8 wherein the slider bushing allows the linkage and at least one slider bar to rotate around the slider bearing and first and second pushrods.

10. The fan assembly of claim 9 wherein as the slider moves away from the pedestal on the at least one slide bar along the fan assembly axis, the first and second pushrods mounted on the slider bearing push the first and second butterfly doors toward the open position.

11. The fan assembly of claim 1 wherein as the slider moves back toward the pedestal, movement of the first and second pushrods allows the butterfly doors to return to the closed position aided by a biasing force of the spring attachments.

12. A fan assembly for use in a sidewall of an animal house, the fan assembly comprising:

an impeller;

a motive force configured to rotate the impeller about a fan assembly axis;

a butterfly shutter having shutter frame, a first butterfly door and a second butterfly door, the first and second butterfly doors mounted in the shutter frame and configured to pivot about a central door axis to move between an open position when the impeller is rotating;

a shutter operation mechanism configured to move the first and second butterfly doors between the closed position and the open position in synchrony with an operating speed of the impeller, the shutter operating mechanism comprising:

a pedestal mounted concentrically with a fan shaft such that the pedestal rotates with the impeller;

at least one slide bar extending from the pedestal away from the impeller;

a slider mounted on the at least one slide bar such that the slider moves relative the pedestal along the at least one slide bar;

a first pushrod connected to the first butterfly door and a second pushrod connected to the second butterfly door; and a linkage between the impeller and the first and second pushrods, the linkage comprising at least one weight configured to rotate with the impeller about the fan assembly axis, wherein rotation of the at least one weight causes the linkage to exert a force on the first and second pushrods to push the first and second butterfly doors toward the open position;

wherein the slider has a slider bushing and a slider bearing is positioned within the slider bushing such that the slider bushing rotates around the slider bearing such that when the impeller rotates, the pedestal, the linkage and the slider bushing also rotate with the impeller, while the slider bearing remains rotationally stationary, wherein the slider bearing has a pair of mounting attachments formed thereon, with the first and second pushrods attached to the mounting attachments on the slider bearing, wherein the slider bushing allows the linkage and at least one slider bar to rotate around the slider bearing and first and second pushrods, and as the slider moves away from the pedestal on the at least one slide bar along the fan assembly axis, the first and second pushrods mounted on the slider bearing push the first and second butterfly doors toward the open position;

the shutter operating mechanism further comprising a spring attachment mounted between the shutter frame and the first butterfly door configured to bias the first butterfly door into the closed position, wherein centrifugal force produced by rotation of the weight causes the first arm of the linkage to draw the third pivot joint outwards and away from the at least one slide bar, wherein this movement of the linkage causes the slider to move away from the pedestal on towards the butterfly shutter causing the first and second pushrods to push against and open the first and second butterfly doors.

13. The fan assembly of claim 1 wherein opening of the first and second butterfly doors is positively controlled by centrifugal forces produced by rotation of the impeller.

14. The fan assembly of claim 1 wherein as the rotational speed of the impeller increases, the centrifugal force produced by the rotation of the at least weight increases and corresponding movement of the linkage causes the first and second pushrods to open the first and second butterfly doors.

15. A fan assembly for use in a sidewall of an animal house, the fan assembly comprising:

an impeller;

a motive force configured to rotate the impeller about a fan assembly axis;

a butterfly shutter having shutter frame, a first butterfly door and a second butterfly door, the first and second butterfly doors mounted in the shutter frame and configured to pivot about a central door axis to move between an open position when the impeller is rotating;

a shutter operation mechanism configured to move the first and second butterfly doors between the closed position and the open position in synchrony with an operating speed of the impeller, the shutter operating mechanism comprising:

a first pushrod connected to the first butterfly door and a second pushrod connected to the second butterfly door;

a linkage between the impeller and the first and second pushrods, the linkage comprising at least one weight configured to rotate with the impeller about the fan assembly axis, wherein rotation of the at least one weight causes the linkage to exert a force on the first and second pushrods to push the first and second butterfly doors toward the open position; and a spring attachment mounted between the shutter frame and the first butterfly door configured to bias the first butterfly door into the closed position;

wherein as the rotational speed of the impeller decreases, the centrifugal force produced by the rotation of the at least one weight decreases and a biasing force of the spring attachment overcomes the centrifugal force causing the first and second butterfly doors to gradually move to the closed position as the impeller slows down, thereby minimizing banging of the butterfly doors into the shutter frame.

\* \* \* \* \*